(12) United States Patent
Tanaka (10) Patent No.: US 9,405,426 B2
(45) Date of Patent: Aug. 2, 2016

(54) METHOD AND SYSTEM FOR PROVIDING AN ADAPTIVE INPUT USER INTERFACE FOR DATA ENTRY APPLICATIONS

(75) Inventor: Jamison M. Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 1308 days.

(21) Appl. No.: 12/979,772

(22) Filed: Dec. 28, 2010

(65) Prior Publication Data

US 2011/0214067 A1 Sep. 1, 2011

Related U.S. Application Data

(60) Provisional application No. 61/309,306, filed on Mar. 1, 2010.

(51) Int. Cl.
G06F 17/24 (2006.01)
G06F 3/0481 (2013.01)

(52) U.S. Cl.
CPC ............ *G06F 3/0481* (2013.01); *G06F 17/243* (2013.01)

(58) Field of Classification Search
CPC . G06F 17/243; G06F 17/211; G06F 17/2247; G06F 17/241; G06F 17/2725
USPC ......................................... 715/221, 223, 226
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |

(Continued)

*Primary Examiner* — Scott Baderman
*Assistant Examiner* — Seung Jung
(74) *Attorney, Agent, or Firm* — Dergosits & Noah LLP; Todd A. Noah (57) ABSTRACT

Embodiments are described for a system and method for adapting an online user input form that provides user input to a web-based application. A method comprises defining one or more attributes related to one or more fields of the online user input form, obtaining historical data comprising past user input to related user input forms, calculating historical most common values for each attribute of the one or more attributes; and modifying the one or more fields of the online user input form in accordance with the calculated historical average values. The attributes may include at least one of the size, location, and datatype of each field of the form. The method may be implemented through an application programming interface for implementation through server-side and client-side processes that are written in a web-browser compatible markup language.

24 Claims, 6 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0262102 A1* | 11/2006 | Lee .......................... 345/173 |
| 2007/0186150 A1* | 8/2007 | Rao et al. .................. 715/506 |
| 2009/0063415 A1 | 3/2009 | Chatfield et al. |
| 2010/0037154 A1* | 2/2010 | Marcos et al. ............. 715/760 |
| 2011/0131479 A1* | 6/2011 | Padgett et al. ............. 715/223 |

\* cited by examiner

100

NEW SALES LEAD
102

NAME ______________ 104

PHONE ______________

ADDRESS ______________

E-MAIL ______________ 106

PRODUCTS ______________ 108

CONTACT ______________

DATE ______________

PRIOR CONTACT? ☐ YES ☐ NO — 110

METHOD AND SYSTEM FOR PROVIDING AN ADAPTIVE INPUT USER INTERFACE FOR DATA ENTRY APPLICATIONS

CLAIM OF PRIORITY

This application claims the benefit of U.S. Provisional Patent Application 61/309,306 entitled METHOD FOR PROVIDING AN ADAPTIVE INPUT USER INTERFACE THROUGH SOFTWARE, by Jamison M. Tanaka, filed Mar. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to graphical user interfaces in a networked computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Entering data into a software application is a common process in many online computer applications and web sites. In web sites and web based (browser rendered) applications, this is commonly done using HTML (HyperText Markup Language) forms. In this case, specific tags or elements within the HTML standard such as <input>, <textarea>, <select>, and so on, are used to define screen areas in which user input is to be received. Such input can be in the form of text typed into rectangular fields, boxes that are selected or deselected, and other graphical user input elements. The form elements are rendered in the client browser at a specific size, normally determined by a combination of web browser, CSS (Cascading Style Sheets), JavaScript, and HTML attributes. To enhance the user experience and facilitate interactivity, application designers and developers commonly attempt to provide input fields and other form elements in a size and arrangement that will best suit the expected data. For example a telephone number field in an application localized for the United States consumer market might appear on the form as: (______)______-______. This format exactly fits the expected data of a three digit area code, three digit prefix, and a four digit suffix, and allows the user to simply enter his or her phone number without guessing how the number is to be entered (e.g., with or without the area code or dash).

Many items of input data, however, may not be as easily definable as U.S. phone numbers. In cases where the expected data is relatively unknown, or open to various possible formats, the application must employ a particular design approach to allow for consistent data processing. Examples of typical current design approaches include (1) making a best educated guess of input format based on similar forms used in the past, if any exist; (2) implementing a worst case scenario handler, such as making a field large enough and unformatted so that any conceivable input string will fit; (3) making the fields customizable through application-level, role-level, or user-level preferences; or (4) making the fields customizable on the rendered page through resize controls, or drag and drop resizing and placement operations. There are significant disadvantages with each of these approaches. For example, option 1 is not always viable, especially in distributed enterprise software applications where customers are allowed to use a development toolkit to use build any application they wish and that may include a long list of available object and data types. Option 2 requires reserving large spaces in the page layout that may never even get used, thus causing resource inefficiencies in the application and persistence layers, which is not ideal for performance, scalability, readability, and usability. Options 3 and 4 each add complexity to the code and the user experience, thus increasing chances for bugs and the amount of required training, maintenance, and support costs.

Accordingly, it is desirable to provide techniques enabling efficient and effective user interaction with electronic or online data entry forms through input fields that are optimized based on the type and format of the entered data and the application that is processing this data. Embodiments of currently described approach do not necessarily try to increase the likelihood of page interaction or form submission, as it is assumed that the form will be viewed and filled out and submitted by the user. Instead, the goal is to make the data entry process easier and more accurate.

BRIEF SUMMARY

In an embodiment and by way of example, there are provided mechanisms and methods for providing an adaptive input user interface. These mechanisms and methods can enable embodiments to provide a software method for determining and presenting an adaptive user interface for the input of data, as in a form of a web page or Internet/intranet application, so that the user interface adapts over time and becomes closer to an ideal configuration through programming algorithms that do not require manual runtime actions performed by the user, developer, or administrator.

The adaptive user interface displays or includes an online form that comprises one or more user input fields. The fields may be denoted by a graphical element, such as a box or underlined area that receives user input through keyboard, mouse, stylus or other input devices. One or more attributes defining modifiable characteristics of the online form are defined, such as the size, location, and datatype of the fields in the form. A method for providing an adaptive input user interface under an embodiment includes processing components that process electronic form input data in real-time to obtain a statistical average size for each input data field, a degree of importance for each field, and an optimum datatype associated with each field. The average size data is used to define the size for each field, the degree of importance data is used to determine an optimum location of each field relative to the other fields in the form, and the average datatype input for each field is used to constrain user input to match the optimum datatype for each field. A graphical user interface component then displays the optimally sized fields in their defined locations on the electronic form that is presented to the user. In an embodiment, the graphical user interface (GUI) is used as part of a large enterprise software suite of products, such as a Customer Relationship Management (CRM) system in which several implementations of the software require user input or customer interaction with input data fields. Embodiments can also be directed to any and all applications that require user input into electronic or GUI forms that deal with data of different size and type.

While one or more implementations and techniques are described with reference to an embodiment in which and method for providing an adaptive input user interface is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for methods for providing an adaptive input user interface. Mechanisms and methods for providing methods for providing an adaptive input user interface will be described with reference to example embodiments.

For the purpose of the following description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

A form modification process according to embodiments, analyzes data previously input by one or more users ("historical data") into an online form to determine the presence of persistent characteristics (or values) associated with one or more attributes of the fields within the form. If certain fields are shown to exhibit these persistent attribute values, the form is modified to present the fields in their optimum configuration. Under an embodiment, the GUI and associated input data processing components of a system implementing the form modification process receive form input data and process this data to obtain a statistical average size for each input data field and the degree of importance of the various data fields. For input forms in which the data values are not easily known in advance, the optimum size for each field and the optimum location of each field with an input page or pages are then determined, and the fields are accordingly displayed on the input page(s) by the GUI. The data input to the user interface is dynamically analyzed on a per-user or per-view basis for the purpose of modifying user input presentations within software applications, such as in web forms. The goal is to improve the ease of use and readability and to make development of optimally presented user input interfaces simpler. Field size and field location are two examples of modifiable form attributes that are defined and analyzed by the form modification process. Other attributes relating to the fields within a form include datatypes associated with each field, default formatting definitions of the fields, and other similar characteristics associated with the graphical objects of a field or the functional aspects of a field.

Online or web-browser based applications that provide for some degree of user interaction typically include a plurality of user input fields in which users can type in text or numbers, or make selections, and so on. The fields in such a form are defined by the developer and are typically static for the life of the form and not necessarily optimized for user input. As such, typical online forms are often cumbersome to use because the input fields are not optimally tailored for typical user input, and they may be wasteful as they are designed to accommodate the maximum possible amount of user input, as opposed to the normative amount of user input.

Figure 1:
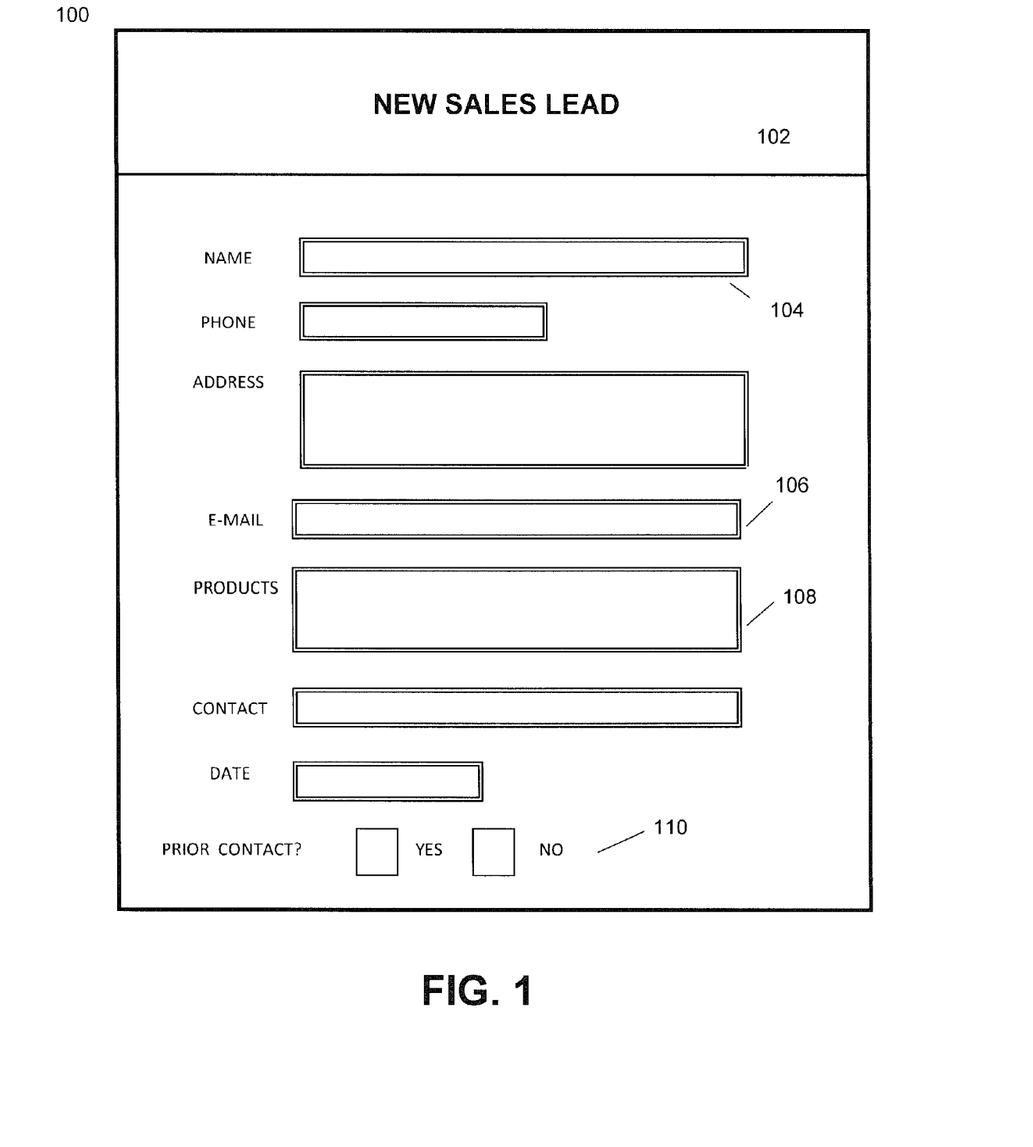
FIG. 1 is a GUI screen shot for an online form that utilizes embodiments of a process for providing adaptive input data fields in an embodiment.

Embodiments of the adaptive user interface system described herein include a form modification process that analyzes historic input data and dynamically modifies the online form to present an optimum user input presentation based on this historic input data. FIG. 1 is a GUI screen shot for an online form that utilizes embodiments of a process for providing adaptive input data fields, under an embodiment. User interface screen 100 includes an online or electronic user input page 102 for the direct entry of user data. The example of FIG. 1 shows a page for entering a sales lead into a customer relationship management database, but this is only one example of a user input page that may be used with embodiment described herein. The input page 102 for a new sales lead includes several different fields for the entry of relevant information. For the example form of FIG. 1, input fields are provided for the potential customer's contact information 104 including name, phone, address, and e-mail address 106. Other fields may also be presented, such as for products the customer is interested in 108, sales contact, and date of lead generation. One or more selection boxes, such as the prior contact question 110 may also be included. As shown in FIG. 1, each input field is denoted by a graphical data object, such as a rectangle or square that is intended to define an input area and contain all of the user input. User input can be any appropriate text, numeric, alphanumeric, or symbolic input, depending upon the input field. In a typical form, each of these fields requires input that is of different type and length. For example, name and phone number are usually limited in data type (either all numbers or all text) and of a fixed maximum expected number of characters, whereas addresses and product descriptions may be much longer and of mixed datatypes. Moreover, the information input into a form may vary among different customers or global regions, or even time periods. It should be noted that the arrangement and composition of the form 102 in FIG. 1 is for illustration only, and any number of different online forms of various arrangements and for various purposes may be used in conjunction with embodiments of the present invention.

An embodiment of the adaptive input user interface system that generates the modifiable form 102 defines certain attributes associated with the form. These attributes define certain characteristics associated with one or more of the fields (e.g., fields 104-108) of form 102. In an embodiment, the attributes include the size of each modifiable field, the location of each field in the form, and the type of data (datatype) restricted by or associated with each field. Modification of the form 102 involves changing the size and/or location of the fields within the form, along with any associated text or data, such as the word "Name" in front of field 104. Such modifications comprise visual modifications that are visible to the user. Other attribute modifications, such as restricting the datatype may be manifested through messages displayed to the user during user input, such as an error message or alarm generated if an improper datatype is entered into a field. The form 102 itself may be defined by the adaptive user interface system such that all of the fields displayed on a page are modifiable, or only a select subset are modifiable.

In an embodiment, and for a specific application such as a database system, the input form 102 of FIG. 1 can be used to generate data records that are stored in a database. In this case, data entered into each field 104 represents a data object that is stored as an entry in the database and is a searchable object that can be used to locate the record or comprise datum within a report generated from the database. As shown in FIG. 1, each field 104 has a certain size, and this size may be reflected in the size of the data entry box. For example, the size of the phone number field may be smaller than the size of the address field because it is almost always certain that a phone number is shorter than an address. The size of the field corresponds to the space reserved for the data in the database, and it is generally advantageous to reserve only the minimal amount of space required for each field to free up database storage space.

Each field 204 is also located in a specific place within the form 102. The location of the field within the page generally indicates the importance of the field relative to the other field with more important fields placed higher or more prominently within the page. Other indicators, such as asterisks or font styles may be used to denote required fields. Locating important fields in certain locations of a page enhances usability of a page as people may wish to ignore fields that do not need to be filled in or that are not particularly important, and it is better to have these fields relegated to bottom or fringe regions of the page. Different fields may have different levels of importance for different users or applications, however, and thus the optimum location of a particular field may not be the same for all use scenarios.

In general use, each field may also be practically limited to only a certain type of data, such as letters only (e.g., person's name), numbers only (e.g., phone number), checkmarks only (e.g., binary response), mixed alphanumeric always (e.g., strong passwords), and so on. Defining specific data types for each field and constraining the input to the corresponding data type facilitates user entry by allowing the system to prompting corrections or auto correcting the user input. It also ensures that system resources can be efficiently allocated for each field within a form.

Figure 2:
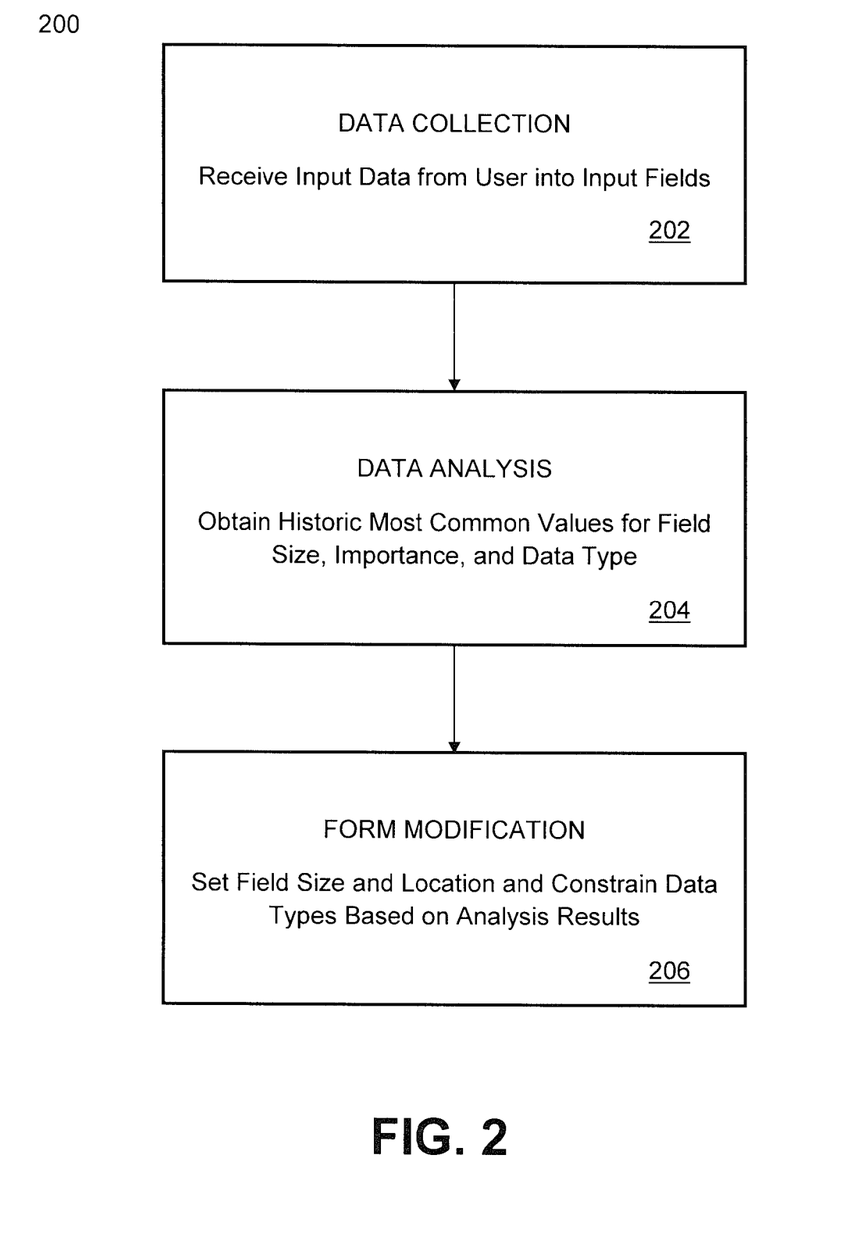
FIG. 2 is an operational flow diagram illustrating a high level overview of a technique for providing an adaptive input user interface in an embodiment.

For the example data entry page 102 of FIG. 2, the input fields (e.g., 104) have several attributes that can be modified to enhance the usability of the form and the efficient processing of the input data. These include, the size of each field, the location of each field within the page, and the data type associated with each field. In an embodiment, the form 102 is dynamically modified to provide a presentation that is optimized to an expected data format for each modifiable field. The expected data format is obtained through an analysis of historical input data, as opposed to through other methods, such as best guess approximations or application-level customization. Thus, an embodiment is directed to a computer-implemented method that defines the size and location of user entry fields within an input page based on certain historical data regarding user input patterns. FIG. 2 is an operational flow diagram illustrating a high level overview of a technique for providing an adaptive input user interface, under an embodiment. As shown in flow diagram 200, the process includes a data collection act 202 in which the system receives input data from the user that is entered into the input fields of the form. Depending upon the system configuration, all data input into a form can be collected and logged for analysis. Alternatively, a set amount of data can be collected or data can be collected over a defined period of time, as dictated by the system. The amount of data that is collected should be sufficient to obtain a measure of historic values of the input data. The historic data may be collected from the same form as it was used for a previous period of time, such as in the case where a form has been deployed for a while. Alternatively, the historic data can be collected from similar other forms that may have the same or similar modifiable fields.

In block 204 the collected data is analyzed to obtain the most common entry value or type of value for the defined attributes of the modifiable fields. In an embodiment, the attributes include the field size, importance and data type for each modifiable field. The most common value represents the typical or optimal value that is entered into a particular field. For example, if a form is used by a retail site for women's products, such as makeup, the most common or expected entry in the gender checkbox for the customer would be 'female'. The most common value for a field is found by analyzing historical data entered for the field and determining the value or entry data for the majority of entries for that field. It can also be determined by calculating a historic average value of entries in a field. In this case, the term 'historic average value' does not necessarily imply a mean average value. Instead, the average value is a calculated value based on a multi-step algorithm. Such an algorithm is configured to discard empty values when considering length, give outlier values less consideration, and other rules suitable for the calculation of average values. In an embodiment, a histogram or distribution of field entries can be used to determine the typical or 'average' entry for each field and helps define the most common value entered into the field, and therefore the entry that is expected when a new user fills out the field. The terms "most common" entry value or "historic average" value may be used interchangeably to refer to the data that is expected to be input into a form, and that is used by the system to modify the display of the form to the user.

The most common entry values for the attributes of the fields are then used to modify the form, block 206. For the attributes of size, importance, and data type, the form modification act includes setting the optimum size of each field, placing each field in a specific location in the form relative to the other fields, and constraining the input data type. The method of FIG. 2 is used to generate an optimized form based on historical most common entry values from a given form. The values are used to render new requests for the form in such a way that the form will hold the anticipated input data in an ideal manner.

With regard to the size attribute, in an embodiment, the data analysis function 204 the process determines the importance of a field by determining the most common entry value for length of text entered into the field. In this case, a default field length may be defined. If the default field width is longer than the average value of the length, the field is lengthened or expanded in height and/or width to accommodate the expected input text length. If the default field width is shorter than the average value of the length, the field size is reduced so that it shrinks to fit the expected input text length. The lengthening or shrinking of the fields is performed by the form modification process 206.

With regard to the location attribute, in an embodiment, the data analysis function 204 determines the importance of a field by determining how often a field is filled in or left blank. In general, if a field is very commonly left blank, its importance could be seen as lower, and when a field is very commonly filled in, its importance could be seen as higher. A field that is always filled-in can be considered a very important or critical field. The form modification process 206 then uses this information to place the fields in the appropriate relative location on a form. A critical or high importance field is typically placed at the top or relatively high position on the form, and a lower importance field is typically placed lower in the form. Other locations are also possible depending upon the positioning of the most prominent locations in the form.

With regard to the data type attribute, the data analysis function 204 determines the type and format of the text entered into each field. In an embodiment, the data analysis function distinguishes between pure alpha text, pure numeric text, and mixed alpha-numeric text. Likewise, certain fields may require only a check mark or blank, such as binary field 110 in FIG. 1. The analysis function 204 determines the most commonly entered data type for a field and the form modification function 206 sets a flag for validation of the user input. For example, if a field is always filled with numbers only, a flag is set marking it as a numeric datatype field. In this case, validation can be performed upon user input that would send a warning if non-numeric data was entered instead. Likewise, if a field is always filled with letters only, a flag is set marking it as an alpha datatype field. In this case, validation can be performed upon user input that would send a warning if any numeric data was entered instead. The setting of the datatype attribute can also be used to validate other input. For example, when a non-required field is virtually always filled in, a blank submitted value could be flagged as a validation warning. The form modification process 206 can also use this information to modify future forms. For example, when a non-required field was virtually always filled with a value, the field might be marked as 'required' in future forms, even in the case where the metadata for the object field did not specify this requirement.

The default settings of a form can also be modified based on the analysis performed for the datatype attribute. For example, if a checkbox is presented as unchecked (i.e., blank) by default, but it is determined that the checkbox was almost always checked when filling out the form, the default setting for a blank form with that checkbox could be changed to the checked state. Similarly, when a field is most commonly submitted with the same value, that value could become the new default value for that field in subsequent renditions of the form.

For each of the defined attributes, the form modification process can be configured to be dynamic with respect to other factors, such as user identity, time period, location, and other similar factors. For example, the default sizes or datatypes might vary from one country to another, and so these attributes could be modified differently depending on the location in which the form is used. In this case, the historic data may reflect this difference to comprise derived data regarding optimal settings. In other cases, pre-obtained facts or customary practices can be used to help the form modification process. As another example, the form modification process could key off other fields or known attributes, such as "users in this location usually supply this value" or "support request forms submitted on weekends usually have a higher priority".

The analysis and form modification processes can also be configured to modify user input forms on the basis of particular users. For example, any of the attributes may be further adjusted depending on whether the most common answer is specific to a group of users, users with a particular role within the application, or an individual user. For example, a member of the quality assurance (QA) department might have new "ticket" objects default to a type value of "bug"; where the same ticket object created by a user of the customer services department might default to type "customer issue."

The form modification process can be modified to allow minimum and maximum thresholds to be set for adaptable attributes (e.g. a minimum length for a text field). Certain forms can be excluded from adaptation, either through an opt-in or opt-out methodology. This allows fields or forms that are meant to be static to be unaffected by any form modification process.

The form modification process also allows for thresholds to be defined to ensure that a sufficient data pool existed before any averages are taken or given weight in adapting the interface. Likewise, the process can be configured to allow for manual overrides to calculate adjustments to any of the fields or forms, when necessary. The process can also be configured to allow for updates to averages, weights, and adjustments to occur at a specified interval or minimum interval, potentially via 'lazy' background thread operations, to avoid impacting performance of the application or website. This can be used when calculating the average length of a field on every page load to determine field size is likely to be prohibitively resource intensive.

In an embodiment, the dynamic form modification functionality can be included in any application or website, and made available through new application program interface (API) in the application building platform.

Figure 3:
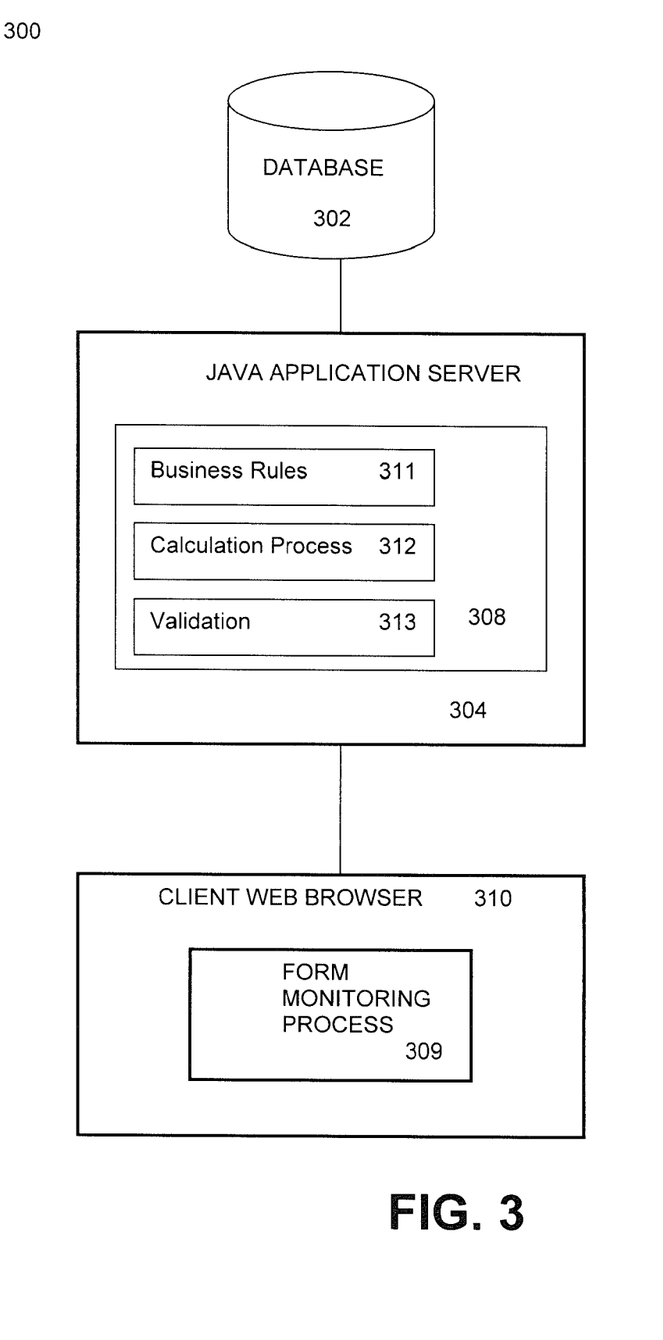
FIG. 3 is a block diagram illustrating a representative network-implemented system for providing an adaptive user interface in an embodiment.

FIG. 3 is a block diagram illustrating an implementation of the form modification system in a web-based client-server computing environment. As shown in FIG. 3, a form modification server process 308 is executed on a server computer system 304. The server computer 304 shown in FIG. 3 is illustrated as a Java application server, but any similar type of server may be used. The form modification server process 308 includes a number of functional components including a business rules process 311, a calculation engine 312 and a validation component 313.

The business rules process 311 applies defined business rules that dictate the operation of the form modification process. The business rules component can be configured to determine when modification of a form is desired or necessary. The form modification process can be programmed to analyze and modify forms on a strict periodic basis, or when a defined and significant enough amount of historic data is available, or when a system administrator instructs the system to update the forms. Business rules can include rules that govern the application of the form modification to particular forms within a set of forms, or to only certain fields of a form. For example, one or more forms within a set of forms may be blocked from modification. Likewise, certain fields of a form may be blocked from modification, or allowed to be modified only under certain conditions, such as time, user group, and so on.

The calculation process 312 analyzes the historic form data as provided by database 302, or any other source of historic form data, to determine the changes to make to the form based on the historic form data. The calculation process 312 includes subcomponents that act on the different attributes that are applicable to the form modification process 308. For the embodiment illustrated in FIG. 2, these attributes include the size of each field, the location of each field within the form, and the datatype associated with each field.

The validation process 313 checks the modifications calculated by the calculation process against the historic data provided by database 302 to validate the modification calculations. The validation process may be used to determine whether or not form modification is required or advantageous. The validation process may be configured to perform periodic checks of the field attributes against current field definitions to inform the business rules process as to whether a form modification session should be performed on the form.

As shown for the embodiment of FIG. 3, the overall form modification system also includes a client side process (client agent) 309 executed on the web browser client 310. One function of the client side agent is to act as a form monitoring process that adapts the form to the type of client device that is running the web browser. The client side agent modifies the display according to the overall size constraints of the client device, as well as any other constraints, such as display resolution, screen orientation, aspect ratio, and the like.

As stated above, the dynamic form modification functionality can be included in any application or website, and made available through new application program interface (API) in the application building platform. In an embodiment, the form modification process can be implemented through Java or JavaScript, or other similar languages. In this case it can leverage web-based markup languages such as HTML (hypertext markup language) and utilizes conventions and tools, such as CSS (cascading style sheets) in the case of existing browser-based user interfaces. A cascading style sheet consists of ASCII text instructions that control how the web browser formats a document that is being loaded. The use of CSS allows the formatting elements to be kept separate from functional elements within an HTML program. CSS uses style tag definitions that define certain formatting characteristics of HTML objects. Example CSS properties include border definitions that set border style/width/color, height and width definitions that set the size of an object, margin definitions, padding definitions that set the space between the border and content, and other similar definitions that set background, color, font, classification, and text properties.

In an embodiment, the attributes to define and modify the fields in a form correspond to the HTML attributes of value and size. The size is defined by a height and width (or row and column) set of values. The location of a field can be defined by an integer value relative to other fields in the form. In this manner, each field has an integer value that dictates its location on the field with the value 1 occupying the highest position in the form, the value 2 occupying the next position, and so on.

For the example form of FIG. 1, the definition of the "Name" field in an embodiment, can be defined as follows:

```
Name: <input name="Name" size = "" value="" style=""
    stringtype="">
```

Once each field is defined, such as for an initial instance of a form, a data collection process collects data relating to how the form is populated. Upon a time or condition defined by the business rules component, the form modification process may then validate the form or modify it depending on whether it is determined that such modification would be optimum for facilitating user input into the form. Once a form modification session is initiated, an appropriate program will perform the modification, An example Javascript routine to gather data regarding how a form is modified might be as follows:

```
<input type="hidden" name="whatChanged" id="whatChanged">
Name: <input name="Name" value="" onchange =
"doSomething(this)">
<script>
    // produce a string like "name:email:phone" to get the order
of input function doSomething(el) {
        document.getElementById('whatChanged').value += (":" +
el.name);
    }
    </script>
```

In the above example script, the 'whatChanged( )' function is a tracking device that indicates which fields were changed in what order, when the form was submitted to the system. The example script gathers data regarding changes, while the actual modification of the form is performed by other program components. In this example, the position of the fields "name" "email" and "company" may have been denoted by an integer number denoting relative position, such as 2, 6, and 10, respectively. The whatchanged function may indicate a reordering of these fields by the assignment of integer values 2, 10, and 6 for the "value" definition. This would cause the reordering of the "email" and "company" fields to swap positions on the formThe relative position of the fields on a form can be modified from an original position to a different position relative to the other fields through a modification of the value definition. Other attributes can be similarly changed, such through the size and datatype definitions. In an embodiment, a client-side or server-side process uses the data provided by the whatchanged function to determine the best ordering or placement of the fields on the form. Other attributes, such as field size and datatype can also be analyzed and modified in accordance with whatchanged-type scripts and form modification processes.

In the above example, the routine may change the order of fields on the form from listing name, e-mail address, and company name, to name, company, and e-mail address. In an embodiment, this modification would be based on the analysis of the most commonly entered values showing that users always or almost always entered a company name, but did not always, or at least less frequently entered their e-mail address. This modification could have been initiated by a periodic trigger of the analysis function, the aggregation of a large amount of data above a defined threshold, or upon the initiative of the system administrator, such as after customer complaints or suggestions.

Figure 4:
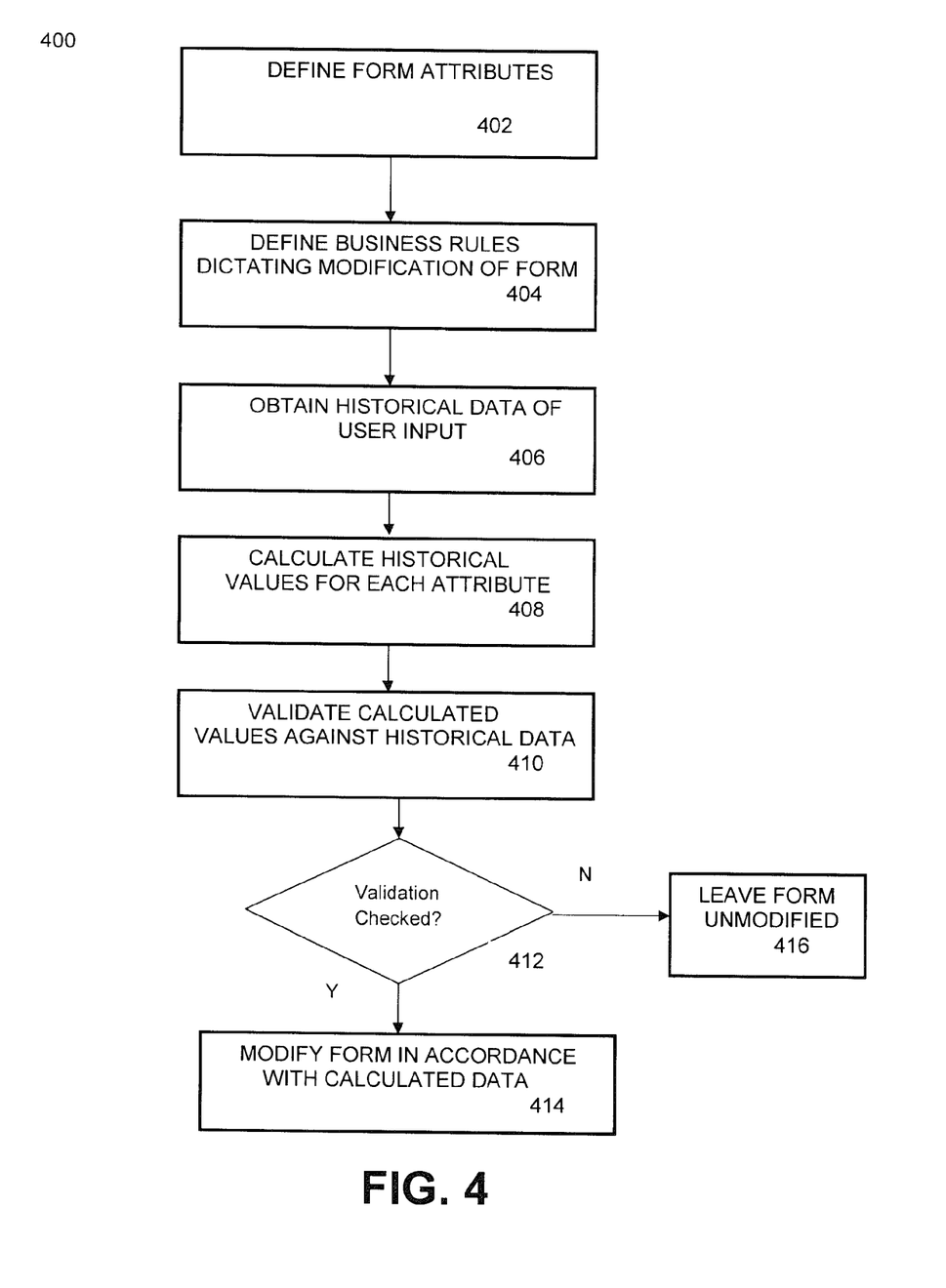
FIG. 4 is an operational flow diagram illustrating a high level overview of a technique for providing an adaptive user interface in an embodiment.

The server-side and client-side form modification processes 308 and 309 of system 300 implement an adaptive input user interface that is presented to the user through client web browser 310. FIG. 4 is an operational flow diagram illustrating a high level overview of a technique for providing an adaptive user interface in an embodiment. As shown in flow diagram 400, the overall adaptive user interface process begins with the definition of form attributes, block 402. This involves defining the characteristics or parameters associated with each modifiable data objects in the form. As described above, this typically comprises defining the size, location and datatype attributes of the fields of the form. However, other attributes for the fields or for other data objects in a form may also or alternatively be defined. The business rules dictating the modification of the form are also defined, as shown in block 404. This involves setting the rules regarding how, when and by whom a form or its data objects may be modified, along with any other relevant rules regarding implementation of the form modification process in the system.

Once the relevant rules and attributes have been defined, the system and process obtain historic data of user input in order to determine how best the defined attributes of the form should be modified, block 406. As shown in block 408, the calculation process then calculates the historical average or most common value for each value from this historic data. If validation is required by the system, the validation process validates the calculated values against the historical data, block 410. The results of the validation check are then obtained, block 412. If the validation check is successful, the form is modified in accordance with the calculated data, block 414. In this case, the fields (or other data objects) of the form may be modified in terms of one or more of the defined attributes (e.g., size, location, datatype). If the validation does not check successfully, the form may be left unmodified, block 416, or only certain data objects of the form may be modified. Alternatively, the process may obtain more or different sets of historic data and/or re-perform the calculation of historical values in order to determine if a different degree of modification is required.

Figure 5:
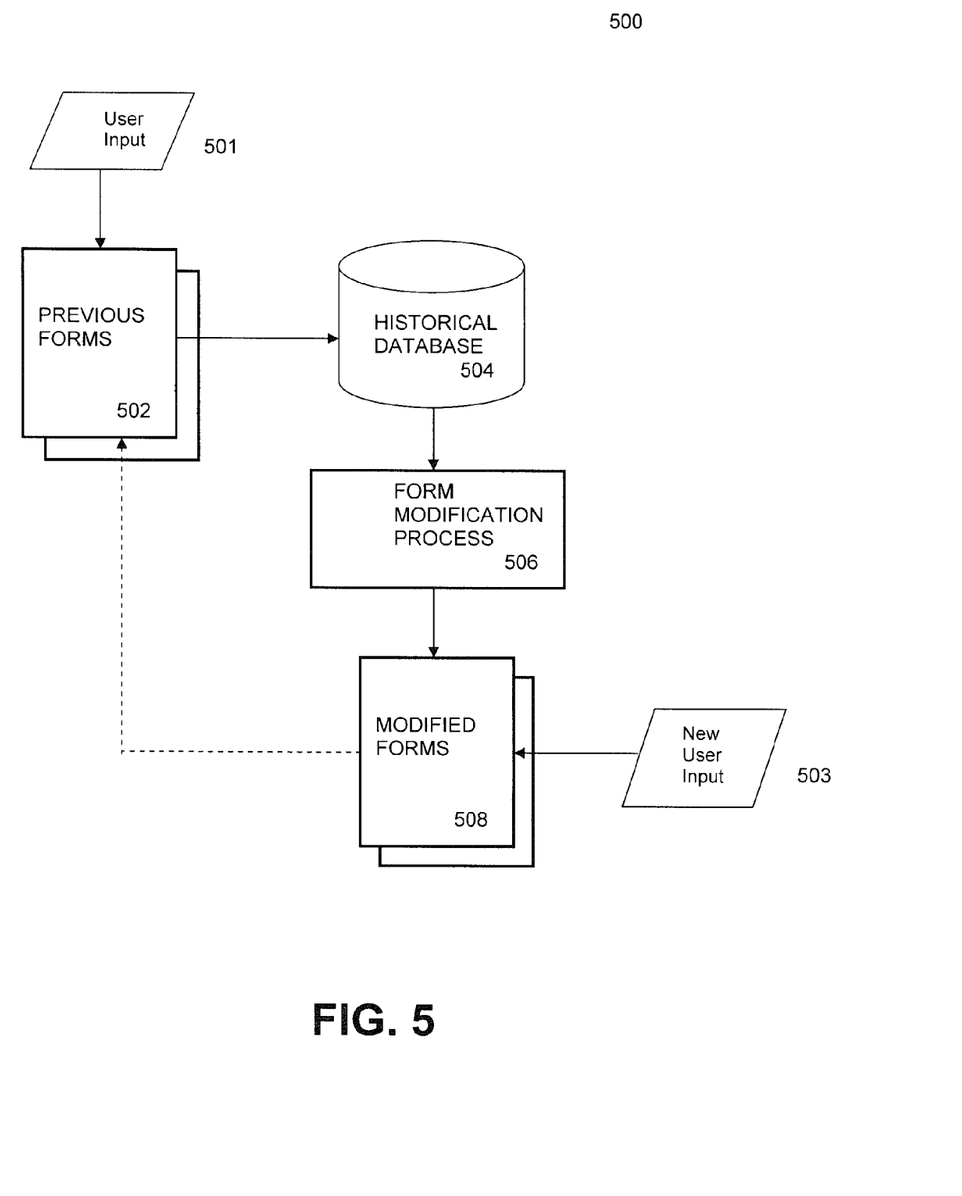
FIG. 5 is a block diagram illustrating the dynamic updating of online forms using an adaptive input user interface system in an embodiment.

In an embodiment, the form modification process of FIGS. 2 and 3 comprise part of an adaptive input user interface system that dynamically adapts and updates user input forms based on past and recurring user input. Thus, user input information is constantly used to maintain the historical database and provide the basis for fine-tuning the interface as continued use of the form provides an ever increasing body of historical data. FIG. 5 is a block diagram illustrating the dynamic updating of online forms using an adaptive input user interface system, under an embodiment. As shown in diagram 600, past user input 501 is provided into previous versions of a form 502. This user input data is stored in a historical database 504. The form modification process 506 then uses this historical data to inform necessary or desired modifications to updated versions of the form, 508. The form should then be optimized for new user input 503 based on the defined attributes and the calculations performed by the form modification process 506. Over time, the modified forms 508 themselves become part of the body of previous forms 502. In this manner, the new user input 503 becomes part of the historical database 504 and can help inform future iterations of the form modification process and the generation of ever more optimized forms.

Embodiments of the adaptive input user interface that employs the form modification process and system facilitate effective user interaction with electronic or online data entry forms through input fields that are optimized based on the type and format of the entered data and the application that is processing this data. Embodiments of currently described approach do not necessarily try to increase the likelihood of page interaction or form submission. According, this approach is different from systems that deliver targeted data or advertisements or other read-only content (e.g., text, video, or Flash content) to encourage more sales or better user retention or click through. These systems are used in targeted marketing or site optimization applications, in which a given historical set of data, program logic, and configuration data, is used to present different web page content to different users visiting the same page of a web site. This is usually marketing or sales driven, such as on consumer web pages or shopping applications. For example, a shopping web site may show suggested items to a visitor based on their buying history or user profile; or a news site may use geolocation techniques to show local and regional news on a landing web page based on the visitor's location. In contrast, embodiments of the present system are configured to adaptively and dynamically modify the user input fields of an online form based on historic input data in order to maximize ease of use of the form.

System Overview

Embodiments of the adaptive user interface can be used in any number of network graphical user interface-based systems, and for any number of applications that require user input into online or GUI generated forms. One such environment is a distributed database application that is implemented over a local or wide area network. One example of such an application is a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 6:
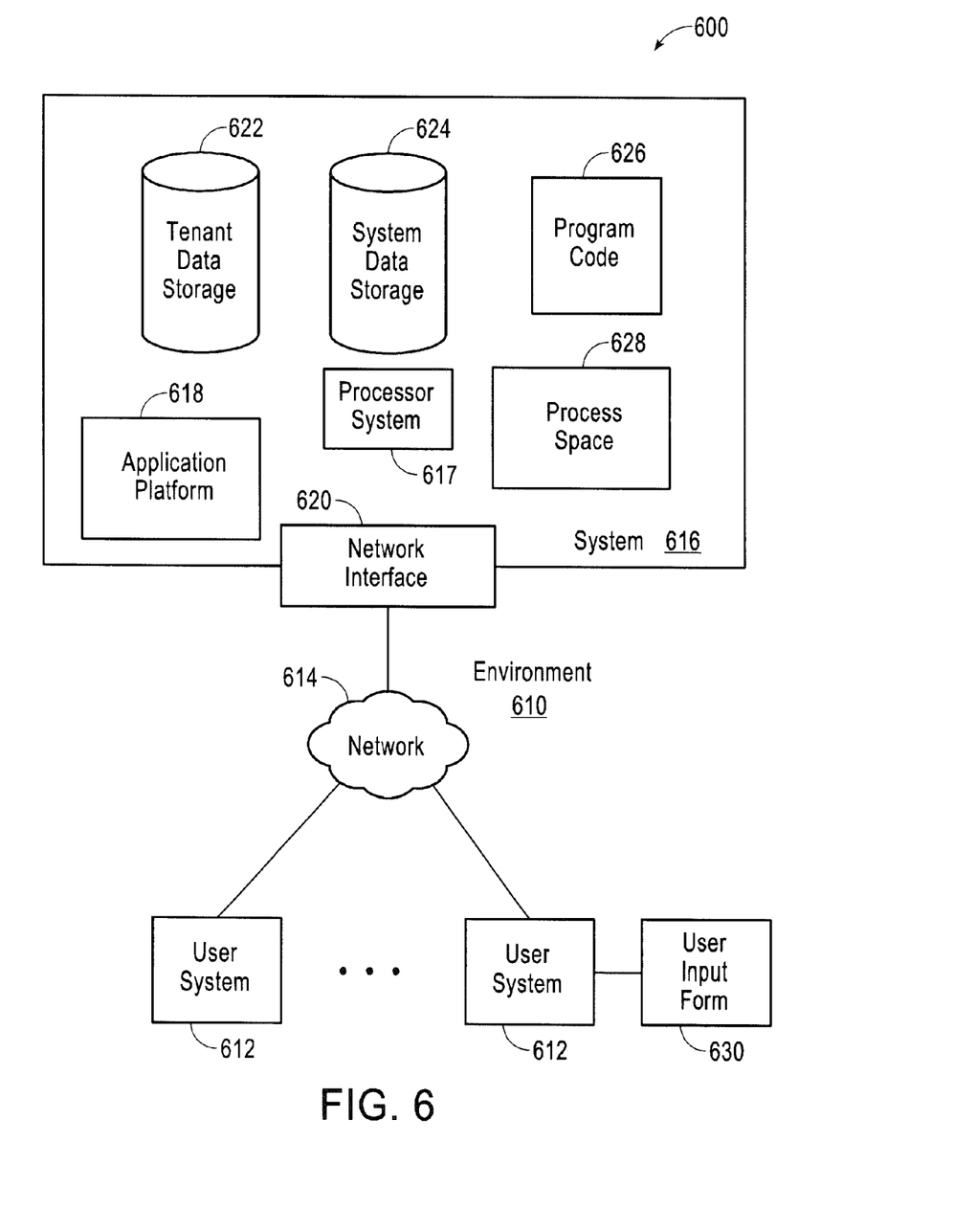
FIG. 6 is a block diagram illustrating an example of an on-demand database service implementing an embodiment of an adaptive input user interface for processing of user input data.

FIG. 6 is a block diagram illustrating an example of an on-demand database service implementing an embodiment of an adaptive input user interface for processing of user input data. FIG. 6 generally illustrates an overall system 600 that includes an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6, user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the terms "on-demand database service 616" and "system 616" may be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

An embodiment of system 616 also includes application servers, such as Java application server 304 of FIG. 3 that is configured to implement and execute software applications that provide interactive forms for the transmission of information to and from user systems 612 and to store to, and retrieve from, a database system related data, objects, and Webpage content. Such a displayed form is illustrated as block 630 accessible through at least one user system 612. The user input form 630 is displayed to the user of user system 612 for entry of relevant user input data. A server-side adaptive input user interface process within a Java application server of system 616 in conjunction with an client agent running on user system 612 dynamically updates the modifiable fields within form 630 in accordance with historical data and certain calculation algorithms, as described above. The user input provided through form 630 is then passed on to the application running on platform 618 or any appropriate application within system 616 that processes the user input.

One arrangement for elements of system 616 is shown in FIG. 6, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an x86 compatible microprocessor or the like. Similarly, system 616 (and additional instances of an MTS, where more than one is present) and all of their components might be operator configurable using application(s) including computer code to run using a central processing unit such as processor system 617, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

In certain embodiments, user systems 612 (which may be client systems) communicate with application servers to request and update system-level and tenant-level data from system 616 that may require sending one or more queries to tenant data storage 622 and/or system data storage 624. System 616 may automatically generate one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing an optimized user input form including a plurality of input fields through web-based for display to a user, the method comprising:
    determining whether an input field on a user input form is an alphanumeric character input field or a binary checkbox to define an input field type;
    determining whether the input field is filled with exclusively numeric, alphabetic, or binary symbol data based on historical data to define a preferred datatype associated with the input field, the historical data comprising past user input to the user input form;
    determining whether the input field is virtually always filled in by a user based on the historical data to define a relative importance of the input field;
    determining a size of the input field based on an average number of characters of the input field as dictated by a historic average size from the historical data to define a preferred input field size;
    adaptively modifying the size of the input field as displayed on a web page based on the preferred input field size;
    adaptively modifying a location of the input field on the user input form based on the relative importance of the input field; and
    constraining a datatype of the input field based on the preferred datatype.

2. The method of claim 1 further comprising creating an adaptively modified form for display to a present user based on the adaptively modified size of the input field, the adaptively modified location of the input field, and the constrained datatype of the input field.

3. The method of claim 2 further comprising obtaining historical data including past user input data provided to a form identical or similar to the optimized user input form.

4. The method of claim 3 further comprising storing the historical data in a database.

5. The method of claim 4 further comprising adding input from present user input to the adaptively modified form to the historical data in the database.

6. The method of claim 1 wherein the size of the input field is modified by adding allocated space to the input field if the historic average size indicates that a current size of the input field is too short, and deleting at least some allocated space from the input field if the historic average size indicates that the current size of the input field is too long.

7. The method of claim 1 wherein the location of the input field is modified by moving the input field higher or lower relative to other input fields in a displayed form based on the relative importance value.

8. The method of claim 7 wherein the location of the input field is coded as an integer value within a programming definition of the input field.

9. An apparatus comprising:
    one or more processors; and
    a non-transitory computer readable medium storing a plurality of instructions, which when executed, cause the one or more processors to:
    determine whether an input field on a user input form is an alphanumeric character input field or a binary checkbox to define an input field type;
    determine whether the input field is filled with exclusively numeric, alphabetic, or binary symbol data based on historical data to define a preferred datatype associated with the input field, the historical data comprising past user input to the user input form;
    determine whether the input field is virtually always filled in by a user based on the historical data to define a relative importance of the input field;
    determine a size of the input field based on an average number of characters of the input field as dictated by a historic average size from the historical data to define a preferred input field size;
    modify, adaptively, the size of the input field as displayed on a web page based on the preferred input field size;
    modify, adaptively, a location of the input field on the user input form based on the relative importance of the input field; and
    constrain a datatype of the input field based on the preferred datatype.

10. The apparatus of claim 9, wherein the instructions, when executed further cause the one or more processors to create an adaptively modified form for display to a present user based on the adaptively modified size of the input field, the adaptively modified location of the input field, and the constrained datatype of the input field.

11. The method of claim 10, wherein the instructions, when executed further cause the one or more processors to obtain historical data including past user input data provided to a form identical or similar to the optimized user input form.

12. The method of claim 11, wherein the instructions, when executed further cause the one or more processors to store the historical data in a database.

13. The method of claim 12 further comprising adding input from present user input to the adaptively modified form to the historical data in the database.

14. The method of claim 9 wherein the size of the input field is modified by adding allocated space to the input field if the historic average size indicates that a current size of the input field is too short, and deleting at least some allocated space from the input field if the historic average size indicates that the current size of the input field is too long.

15. The method of claim 9 wherein the location of the input field is modified by moving the input field higher or lower relative to other input fields in a displayed form based on the relative importance value.

16. The method of claim 15 wherein the location of the input field is coded as an integer value within a programming definition of the input field.

17. A computer program product comprising computer-readable program code to be executed by one or more processors when retrieved from a non-transitory computer-readable medium, the program code including instructions to:

determine whether an input field on a user input form is an alphanumeric character input field or a binary checkbox to define an input field type;

determine whether the input field is filled with exclusively numeric, alphabetic, or binary symbol data based on historical data to define a preferred datatype associated with the input field, the historical data comprising past user input to the user input form;

determine whether the input field is virtually always filled in by a user based on the historical data to define a relative importance of the input field;

determine a size of the input field based on an average number of characters of the input field as dictated by a historic average size from the historical data to define a preferred input field size;

modify, adaptively, the size of the input field as displayed on a web page based on the preferred input field size;

modify, adaptively, a location of the input field on the user input form based on the relative importance of the input field; and     constrain a datatype of the input field based on the preferred datatype.

18. The apparatus of claim 17, wherein the instructions, when executed further cause the one or more processors to create an adaptively modified form for display to a present user based on the adaptively modified size of the input field, the adaptively modified location of the input field, and the constrained datatype of the input field.

19. The method of claim 18, wherein the instructions, when executed further cause the one or more processors to obtain historical data including past user input data provided to a form identical or similar to the optimized user input form.

20. The method of claim 19, wherein the instructions, when executed further cause the one or more processors to store the historical data in a database.

21. The method of claim 20 further comprising adding input from present user input to the adaptively modified form to the historical data in the database.

22. The method of claim 17 wherein the size of the input field is modified by adding allocated space to the input field if the historic average size indicates that a current size of the input field is too short, and deleting at least some allocated space from the input field if the historic average size indicates that the current size of the input field is too long.

23. The method of claim 17 wherein the location of the input field is modified by moving the input field higher or lower relative to other input fields in a displayed form based on the relative importance value.

24. The method of claim 23 wherein the location of the input field is coded as an integer value within a programming definition of the input field.

\* \* \* \* \*